UNITED STATES PATENT OFFICE.

DÉSIRÉ ALEXANDRE VENOT AND LOUIS FIRMIN CHASSEIGNE, OF PANTIN, FRANCE.

MATCH AND THE PROCESS OF MAKING THE SAME.

1,208,411.  Specification of Letters Patent.  Patented Dec. 12, 1916.

No Drawing. Application filed August 4, 1911, Serial No. 642,241. Renewed May 4, 1916. Serial No. 95,499.

*To all whom it may concern:*

Be it known that we, DÉSIRÉ ALEXANDRE VENOT and LOUIS FIRMIN CHASSEIGNE, both of Pantin, Seine, France, and citizens of the Republic of France, have invented certain new and useful Improvements in Matches and the Processes of Making the Same, of which the following is a full, clear, and exact specification.

This invention has for its object a method of manufacturing lucifer matches whereby the composition of matter forming the igniting tips or mediums contains neither vegetable nor animal paste, gum or glue such as gelatin, glue, dextrin, casein, gumdragon, Senegal gum and the like, for which a mineral substance is substituted; sulfur for instance, or any other substance having similar properties.

The composition which is a standard specimen of the match tip composition is the following:

| | |
|---|---|
| Sulfur | 65% |
| Powdered glass | 10% |
| Amorphous phosphorus | 25% |

The proportion above indicated may be modified according to the class of matches to be produced. The powdered glass and the amorphous phosphorus may be likewise replaced by other substances capable of producing similar results.

This composition which is used when heated to a temperature of from 140° to 160° C. may be utilized for the matches known as Swedish matches requiring a special rubber as well as for ordinary matches which ignite when rubbed on any surface.

The method of manufacture according to the above invention possesses the following advantages: The igniting tips of matches formed with this substance or composition are absolutely insoluble in water even at a temperature well exceeding 100° C. and are thus able to withstand, without any fear of being damaged, the effects of moisture when kept for a long time in a very damp place. The instantaneous drying of the tips dispenses with any drying operation and allows of the matches being forthwith boxed up as soon as the splints have been chemically treated. The amorphous mixture of the sulfur and of the phosphorus heated by means of steam apparatus at a temperature of 150° or thereabout presents no danger when in use.

The invention applies to the manufacture of matches of all kinds and of all descriptions, wooden matches, wax vestas, cardboard matches and the like.

In practising the process herein described the sulfur serves as a carrier or matrix for the phosphorus or other substance or substances employed for starting the ignition of the match by frictional heat, being especially well adapted for this purpose, as it is itself combustible, is solid at ordinary atmospheric temperatures, but fuses at a low heat, that is, one that is below the igniting point of dry wood, such as is employed for the match splints, and is entirely free from and does not absorb or take up moisture. So also the tip composition, as a whole, is anhydrous and is not mixed or otherwise associated with any solvent substance whatever when applied to the splints.

What we claim is:

1. The herein described improvement in the art of manufacturing matches which consists in forming a solvent-free composition comprising a matrix or carrier of a combustible substance that fuses at a low heat but is solid at atmospheric temperatures, and a substance mixed therewith that ignites by frictional heat, fusing such composition, and dipping the match splints into the said fused composition.

2. The herein described improvement in the art of manufacturing matches which consists in forming a solvent-free ignition-tip composition that fuses at a low heat, is solid at atmospheric temperatures, does not absorb moisture from the atmosphere, and comprises sulfur and amorphous phosphorus, and applying such composition to the match splints while in a fused condition to form the ignition tips.

3. A match having a non-hygroscopic, anhydrous ignition-tip, which is frictionally ignitible and insoluble in water, comprising as a binder a fused matrix of a water-insoluble substance solid at ordinary temperature but melting at a temperature materially below the temperature of ignition of the tip.

DÉSIRÉ ALEXANDRE VENOT.
LOUIS FIRMIN CHASSEIGNE.

Witnesses:
H. C. COXE,
ENOLAS LEROY.